US012138219B2

(12) United States Patent
Gummin et al.

(10) Patent No.: US 12,138,219 B2
(45) Date of Patent: Nov. 12, 2024

(54) BODY MASSAGER USING SHAPE MEMORY ALLOY COMPONENTS

(71) Applicant: MIGA MOTOR COMPANY, Silverton, OR (US)

(72) Inventors: Mark A. Gummin, Silverton, OR (US); Howard S. Cohen, Berkeley, CA (US)

(73) Assignee: Miga Motor Company, Silverton, OR (US)

( * ) Notice: Subject to any disclaimer, the term of this patent is extended or adjusted under 35 U.S.C. 154(b) by 678 days.

(21) Appl. No.: 15/329,209

(22) PCT Filed: Mar. 17, 2016

(86) PCT No.: PCT/US2016/022852
§ 371 (c)(1),
(2) Date: Jan. 25, 2017

(87) PCT Pub. No.: WO2016/153917
PCT Pub. Date: Sep. 29, 2016

(65) Prior Publication Data

US 2017/0252260 A1 Sep. 7, 2017

Related U.S. Application Data

(60) Provisional application No. 62/137,022, filed on Mar. 23, 2015.

(51) Int. Cl.
*A61H 7/00* (2006.01)
*A61H 11/00* (2006.01)

(52) U.S. Cl.
CPC ............ *A61H 7/001* (2013.01); *A61H 11/00* (2013.01); *A61H 2201/0138* (2013.01); *A61H 2201/0207* (2013.01); *A61H 2201/0228* (2013.01); *A61H 2201/1207* (2013.01); *A61H 2201/1623* (2013.01); *A61H 2201/1664* (2013.01); *A61H 2201/50* (2013.01); *A61H 2201/5002* (2013.01)

(58) Field of Classification Search
CPC ........... A61H 7/001; A61H 2201/0134; A61H 2201/0138; A61H 2201/0142; A61H 2201/0149; A61H 2201/0228; A61H 2201/1623; A61H 11/00; A47C 7/46; A47C 7/462
USPC ........................................... 297/284.4, 284.5
See application file for complete search history.

(56) References Cited

U.S. PATENT DOCUMENTS 5,190,347 A * 3/1993 Shiow-Lan ............ A47C 7/425 297/230.11
7,086,100 B1 * 8/2006 Lo ......................... A47D 7/002 5/110

(Continued)

*Primary Examiner* — Colin W Stuart
*Assistant Examiner* — Douglas Y Sul

(57) ABSTRACT

A massage apparatus includes a frame defining a central opening, with a web of mesh cloth or fabric spanning the opening. A plurality of SMA wire segments span the central opening directly adjacent to the cloth or fabric. The wire segments are joined at opposed ends to a power circuit that provides ohmic heating for the wires. The wires may be actuated singly and sequentially, the contraction of each wire providing a compression of the body portion upon which it impinges. The apparatus may be a portable massage device for use with any chair, or built into a chair or bed or other furniture, or a slipcover.

20 Claims, 6 Drawing Sheets

(56) References Cited

U.S. PATENT DOCUMENTS

| | | | | |
|---|---|---|---|---|
| 9,033,416 | B1 * | 5/2015 | Vanderhorst | A47C 7/46<br>297/230.11 |
| 2002/0061692 | A1 * | 5/2002 | Steckmann | B32B 15/02<br>442/229 |
| 2002/0190564 | A1 * | 12/2002 | Coffield | A47C 5/06<br>297/452.56 |
| 2005/0218710 | A1 * | 10/2005 | Browne | A47C 5/00<br>297/452.64 |
| 2005/0253425 | A1 * | 11/2005 | Asada | B60N 2/5621<br>297/180.1 |
| 2007/0084220 | A1 * | 4/2007 | Asada | B60N 2/976<br>62/3.61 |
| 2007/0188004 | A1 * | 8/2007 | Browne | A47C 7/38<br>297/391 |
| 2007/0246285 | A1 * | 10/2007 | Browne | B60R 7/043<br>180/273 |
| 2007/0252417 | A1 * | 11/2007 | Neustat | A47C 7/72<br>297/217.1 |
| 2009/0043365 | A1 * | 2/2009 | Friedland | A61H 1/008<br>607/108 |
| 2009/0266925 | A1 * | 10/2009 | Browne | D03D 1/0005<br>242/410 |
| 2009/0302708 | A1 * | 12/2009 | Takahashi | F03G 7/065<br>310/306 |
| 2010/0234779 | A1 * | 9/2010 | Asvadi | A61H 1/008<br>601/84 |
| 2014/0081187 | A1 * | 3/2014 | Wyatt | A61H 7/007<br>601/152 |
| 2015/0065930 | A1 * | 3/2015 | Wyatt | A61H 11/00<br>601/150 |

* cited by examiner

BODY MASSAGER USING SHAPE MEMORY ALLOY COMPONENTS

TECHNICAL FIELD

This invention relates to a massage apparatus and, more particularly, to a massage device that employs shape memory wire as the moving elements.

BACKGROUND ART

The fact that there are many massage devices known in the prior art speaks to the need for massage mechanisms to augment and supplant traditional manual massages. The simplest devices consist of beads or smooth lugs strung on a plurality of cords and adapted to be used manually by holding the opposed ends of the assembly and dragging across the surface of the limb or body portion to be treated. Similar assemblies are designed as pads to be placed on chair seats or backs so that the user may sit against the beads or lugs and experience the protrusions of the objects pushing into the body portions in contact with the assemblies. These devices clearly are passive mechanisms that rely on the weight and movement of the user to gain the massage effect.

There is also known in the prior art a variety of massage mechanisms that are driven by electrical motors. Generally, these devices include cams or lugs mounted on shafts that rotates slowly to enable the lobes of those objects to slowly push into the flesh of the body portions impinged by the device. It is typically required to include a gear reduction system to transform the rapid rotation of the electrical motor into the necessarily slow rotation of the shaft. Such mechanisms are generally bulky and heavy, and therefore must be incorporated into a piece of furniture such as a dedicated "massage chair" or the like. Although mechanical massage devices are available as portable "massage pads" they tend to have substantial thickness in order to house the mechanisms, and therefore they occupy a substantial portion of the sitting space when used in an existing chair.

The most notable drawbacks of massage chairs are that they generate too much noise (the motors and gears in particular), they are not easily portable, due to their weight and bulk, and their massage motion can be experienced as repetitive, and as too forceful and aggressive. In addition, they tend to be costly, due to the extensive mechanical assemblies and electrical controllers.

DISCLOSURE OF INVENTION

The present invention generally comprises a massage apparatus that employs shape memory alloy (SMA) wire to create a massage effect when the SMA wires contract upon heating. The SMA wire operates through the mechanism of ohmic heating, and the waste heat developed by the wires is a synergistic element of the massage effect.

The massage apparatus includes a frame that is substantially rigid or slightly flexible and resilient, the frame defining a central opening, with a web of mesh cloth or fabric spanning the central opening. A plurality of SMA wire segments are extended to span the central opening directly adjacent to the cloth or fabric. Each wire segment may be housed in a tubing portion that protects the wire and modulates the heat emanating therefrom. The wire segments are joined at opposed ends to a power circuit that provides ohmic heating for the wires. The power circuit may include a current source and a programmable controller or the like that operates a MOSFET or similar power gating device. The controller may be programmed to pulse width modulate the current from the source to control the ohmic heating of the wires. As is known, the wires may be heated past their shape transition temperature, causing them to contract in length and to relax and extend when cooled.

A user of the massage device may rest a portion of the body (back, for example) against the mesh or cloth spanning the central opening. The SMA wires thus are caused to follow the curvature of the body portion and extend therealong. The wires may be actuated singly and sequentially, the contraction of each wire providing a compression of the body portion upon which it impinges. The compression is felt as a squeeze of the impinging flesh, and experienced as a massage stroke. At the same time, the heat required to activate the wire is conducted partially into the impinging flesh, providing warmth as well as a massage stroke. This process is substantially silent, unlike prior art powered massage devices.

The SMA wires may be operated sequentially to provide a massage "wave" that proceeds along the impinging flesh of the body portion, in a peristaltic manner. The massage wave may be directed so that it encourages blood flow in the body portion toward the heart, or for some purposes it may be reversed. The massage wave may also be directed laterally; that is, not necessarily respective of the blood flow direction.

The SMA massage device may be embodied as a portable device that is lightweight, so that it may be used in conjunction with an existing chair or bed. In addition, it may be used in a wheelchair to serve disabled individuals, and powered by a battery pack that is rechargeable. Likewise, the device may be employed in conjunction with aircraft or automobile and truck seats to treat drivers or passengers, and may be powered by the onboard vehicle power system.

Alternatively, the SMA massage device may be built into a chair as a portion of the chair back and/or seat construction, and may be powered by rechargeable battery pack or plug-in source. Likewise, the device may be incorporated in a bed construction.

BEST MODES FOR CARRYING OUT THE INVENTION

Figure 1A:
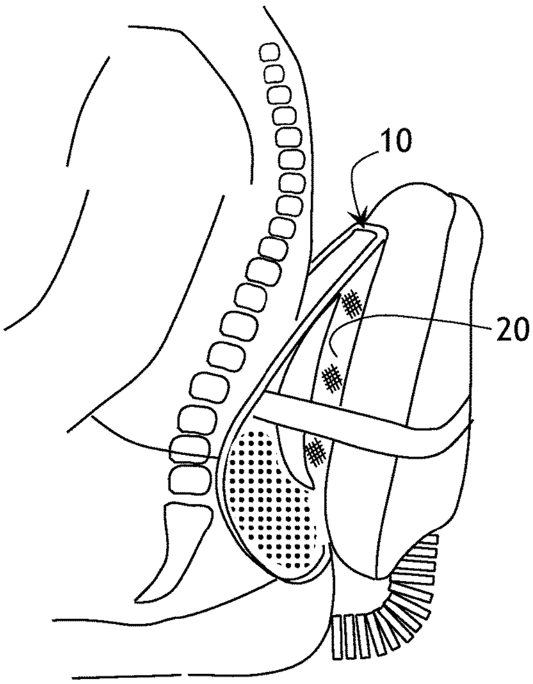
FIGS. 1A and 1B are perspective views of a typical prior art back support apparatus.
Figure 1B:
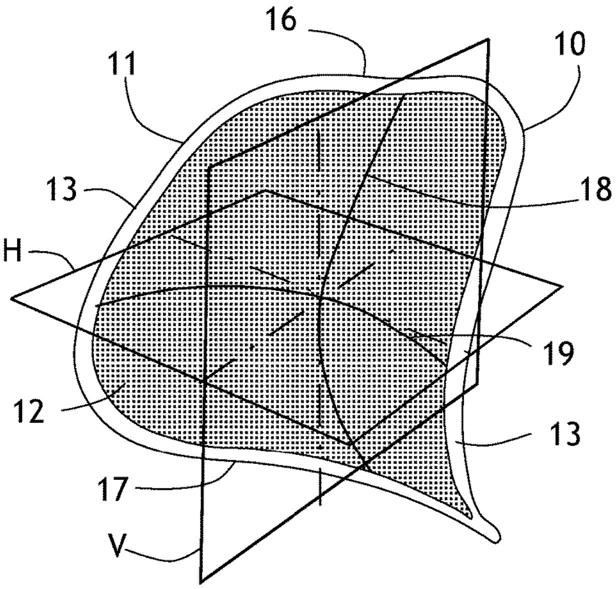

The present invention generally comprises a massage apparatus that employs shape memory alloy (SMA) wire to create a massage effect. One embodiment of the SMA massage device comprises a portable assembly adapted for use with a wide range of existing chairs. As shown in FIGS. 1A and 1B, there is known in the prior art a lumbar back support 10 adapted for use by individuals who experience pain and discomfort in the lumbar region of their back. A typical support device that is commercially available includes a frame 11 comprised of a form-retaining material such as steel wire or the like that is rigid or slightly flexible, and which is formed in a closed loop. A web 12 of mesh cloth or other fabric is stretched across the frame to fill the opening therein entirely. The frame 11 includes laterally opposed arcuate side portions 13 that are curved from a bisecting vertical (YZ) plane V to define a convex curve as viewed from the user in situ, and vertically opposed top and bottom portions 16 and 17 that are formed to define a concave curvature in the horizontal (XY) plane H as viewed from the user in situ. Rear straps 20 extend under tension between the top and bottom portions 16 and 17 and maintain the bowed curvature of the frame.

The combined effect of these curvatures of the frame 11, as shown in FIG. 1B, is that the contour of the web 12 has a convex curvature 18 in the vertical plane V, and a concave curvature 19 in the horizontal plane H. As a result, the web 12 tends to wrap laterally around the lower back of the user, and to project into the natural concavity of the lumbar portion of the back of the user. Thus the lumbar back portion is contacted and impinged by the resilient mesh material with a pressure that is smoothly distributed throughout the concave contacting portions of the mesh material. Hence lumbar back support is provided.

Figure 2:
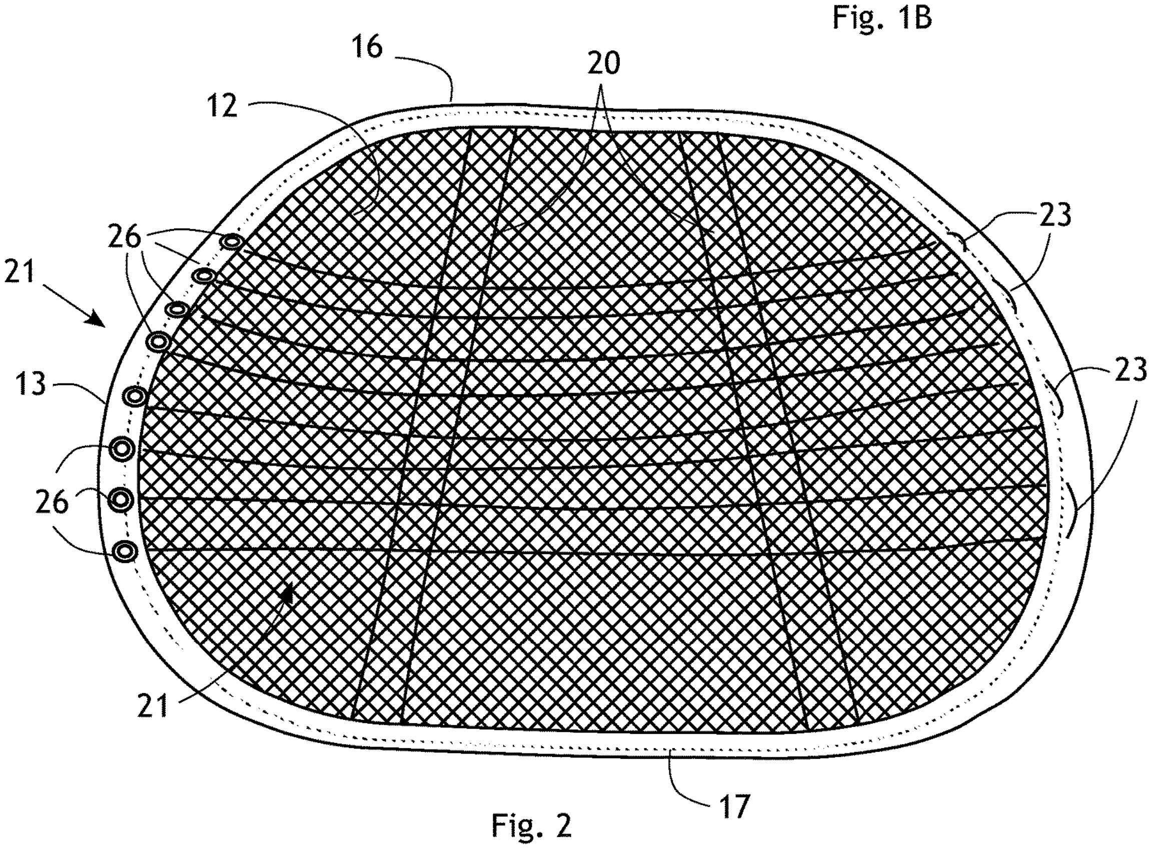
FIG. 2 is a plan view of one embodiment of the shape memory alloy massage apparatus of the invention.
Figure 3:
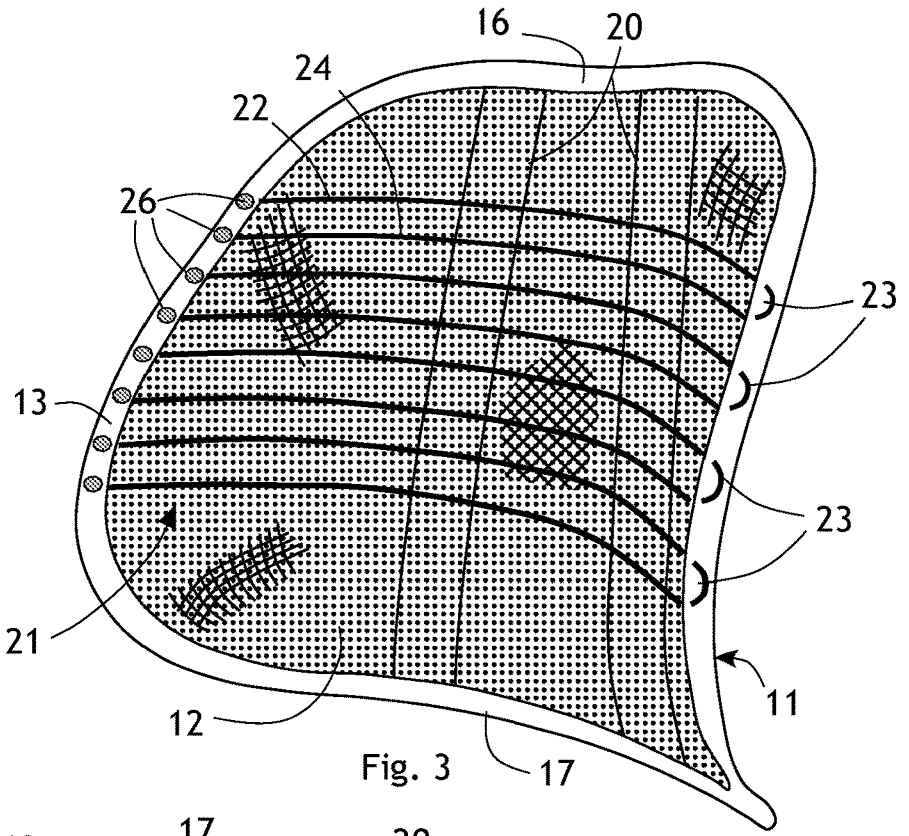
FIG. 3 is a perspective elevation of the SMA massage apparatus shown in FIG. 2.

The lumbar back massager includes a plurality of shape memory wire segments 21 (FIGS. 2 and 3). Each segment 21 may be housed in a flexible tubing (such as silicone or Teflon™ or the like), though this is not a necessity. Alternatively, the SMA wires may be sewn or stitched onto fabric layers, which may provide the desired thermal and electrical isolation and insulation properties. Each SMA wire segment 21 includes one leg 22 extended laterally from one side of the frame of the support, across the web 12 of mesh material, looped at 23 at the opposed side, and redirected as a second leg 24 generally parallel to the leg 22 and extending back to the first side of the frame. The ends of the segment 21 are secured to electrical connectors 26, which in turn are joined electrically to a power circuit described below. Most of the extent of the legs 22 and 24 of the segments 21 are disposed adjacent to the rear surface of the mesh material. In the preferred embodiment there are four segments 21, each connected separately to the power circuit for individual actuation. The wire segments 21 may be woven through the mesh material, or attached minimally thereto, or merely extended adjacent to the mesh material, as long as they are positioned to impinge on the web material 12 and thus on the user.

Figure 4A:
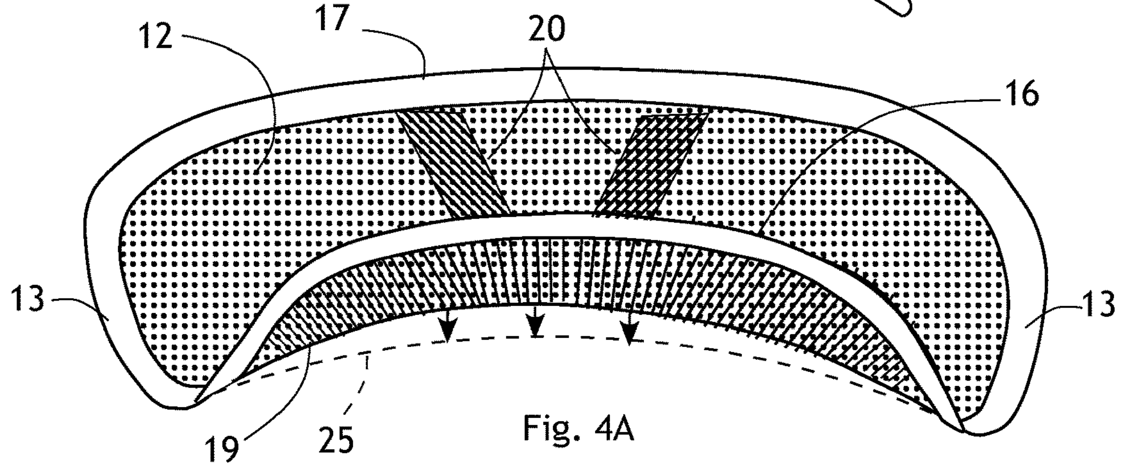
FIGS. 4A and 4B are top views of the massage device of FIGS. 2 and 3, showing the quiescent and actuated states, respectively, of the apparatus.
Figure 4B:
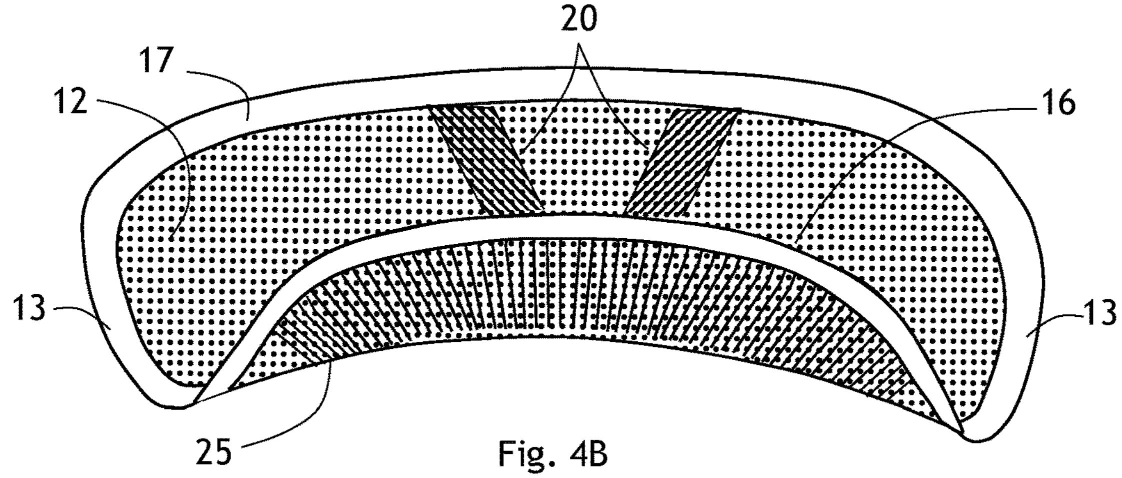

As shown in FIG. 4A, when the wire segments 21 are not actuated the web 12 of taut mesh material defines a concave arc that engages the lumbar portion of the back of the user. As each wire segment 21 is activated by ohmic heating, it contracts and, as indicated by the arrows in FIG. 4A and shown in FIG. 4B, causes the concave arc 19 of the mesh material to flatten somewhat (25) and impinge more firmly on the lumbar portion of the back of the user. This effect is experienced by the user as massage pressure which is comforting and pleasurable. In addition, the heat given off by the actuated segment 21 is also a pleasurable sensation.

The segments 21 may be activated in any desired sequence; for example, they may be actuated serially and sequentially from top to bottom to provide a rolling, peristalsis-like massage motion. This sequence tends to provide a relaxing effect. Alternatively, the segments 21 may be actuated from bottom to top, tending to drive circulation toward the head and to be mentally stimulating to the user. Other sequences may be programmed into the power control circuit as desired. In addition, the segments may be activated in response to sensor input from biometric or neurometric sensors built into or attached to the mesh or fabric component 12.

In a preferred embodiment there are 2-6 SMA wires of 0.015" diameter Flexinol™ each wire roughly 33" long and terminated in a 'lug' 26 for ease of electrical connection. The SMA wires are preferably enclosed in a thin wall plastic tubing, such as Teflon™ or the like, to provide thermal protection so that the warm SMA wires do not melt the fabric or cause excessive heating that may be distracting to the user.

Figure 5:
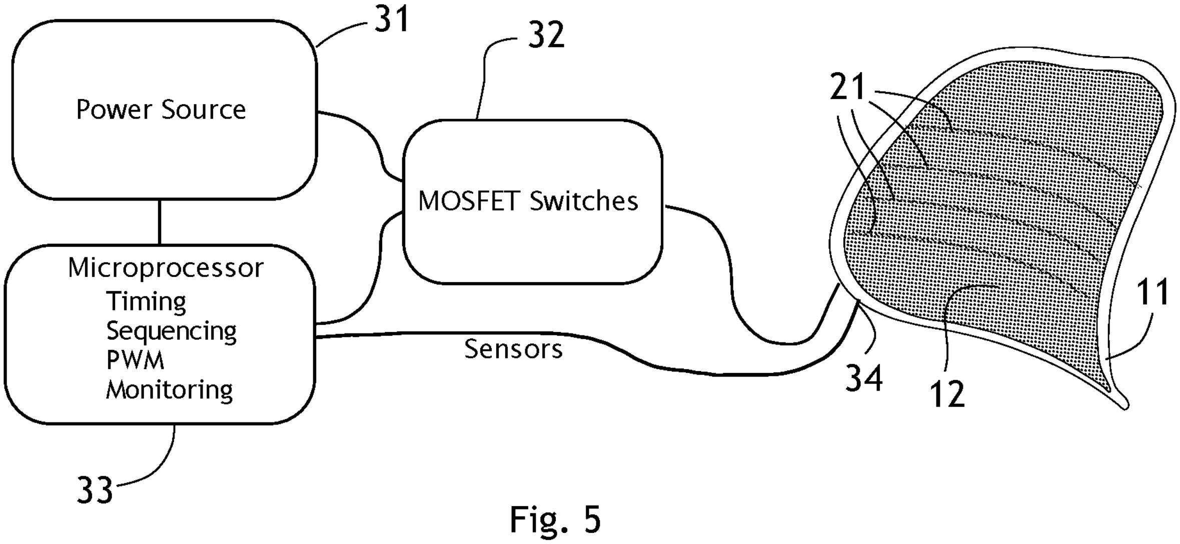
FIG. 5 is a functional block diagram depicting the electrical system for powering and controlling the apparatus depicted in FIGS. 2-4.

With regard to FIG. 5, the electrical system of the SMA massage device includes a power source 31 connected through a plurality of MOSFET switches 32 to the wire segments 21. A microprocessor 33 is connected to the power source and to the MOSFET switches 32. The microprocessor receives power from the source 31 and is programmed to actuate the MOSFET switches 32, providing timing, sequencing, and pulse width modulation of the power to the SMA wire segments 21. A signal line 34 also provides sensor signals to the microprocessor. The sensors may include operating temperature and wire tension, as well as biometric sensors that indicate the status of the user. The microprocessor 33 may also be controlled wirelessly using remote control or Bluetooth™ wireless technologies or the like, thus enabling users to operate the massager via their smart phones or similar devices.

Each wire may be heated for roughly 1.5-2.0 seconds using the microprocessor to provide signals that switch electrical current through the MOSFET switches. Voltage and duty cycle (if using Pulse Width Modulation) varies based on the desired effect and the exact length of the SMA wire. One desirable massage feeling is achieved by 'rolling' the compression of the mesh support from top to bottom: sequentially operating each individual SMA wire 'zone'. There can be from 2 to 6 zones: each location targeted to provide compression independent of the adjacent zones.

Heating of the SMA wire is achieved by Joule heating, and the power source 31 may comprise batteries, AC adapters, automotive power circuits, or any other power source. In this case, the SMA wire segments are woven through or attached to the mesh 12 so that individual wires are constrained to provide motion largely normal to the woven mesh surface, and directly into the user's back muscle tissue.

The SMA wires can be wired in numerous configurations to provide optimal compression times vs desired force (which varies with wire diameter, and greater forces can be applied with larger wire diameters). Larger current is required for larger SMA wire diameters, and higher voltages are required for longer SMA wire lengths. Wires can be operated individually, in series, or in parallel, or combinations of these. As shown, the 4 'zones' are actually created using only 2 SMA wires of roughly 66" total length, with a center Ground-wire connection, and positive voltage applied at opposite ends of the wire.

More SMA wire zones can be added to create a rolling compression wave along the entire length of the mesh support. A ridged steel wire of roughly 0.125" diameter of the frame 11 maintains the complex form of the fabric, allowing the SMA actuator to return under the spring restoring force of the taut fabric and the steel wire upon removal of current.

The rolling compression waves also produce heat, which is a very desirable 'side effect' of the SMA actuation, and the amount of heat generated can be controlled using additional layers of fabric, heating and cooling time controls, protective Teflon or other tubing thickness, and other means.

The wire segment arrangement shown in FIG. 3 is notable because all of the electrical connection to the segments are disposed at one side of the apparatus, which enables the use of one electrical cable leading to that one side to power the device. However, one skilled in the art may understand that use of different wire diameters and configurations may result in different massage 'effects' and that similar effects could be realized using other frames, support structures, and fabric combinations. Also, that the SMA wires may be sewn directly into or onto the mesh fabric using any number of attachment techniques, either during manufacture of the wire and mesh support or after the fabrication of that device.

The massage device of the invention may be embodied as a standalone assembly, or may be incorporated into any chair construction that provides a mesh or textile material forming a portion of the chair upon which the user supports a portion of the body. Likewise, the device may be embodied as an automobile accessory and used in conjunction with an automobile seat, with operating power provided by connection to a power port commonly available in most automobiles. The massage device may also be used in conjunction with aircraft seats in a similar manner.

It is also within the scope of the invention that sensors may be included within the device that permit temperature, SMA wire strain or stress monitoring, and other functions including tip/tilt sensors that may be utilized for safety purposes, for example.

Figure 6:
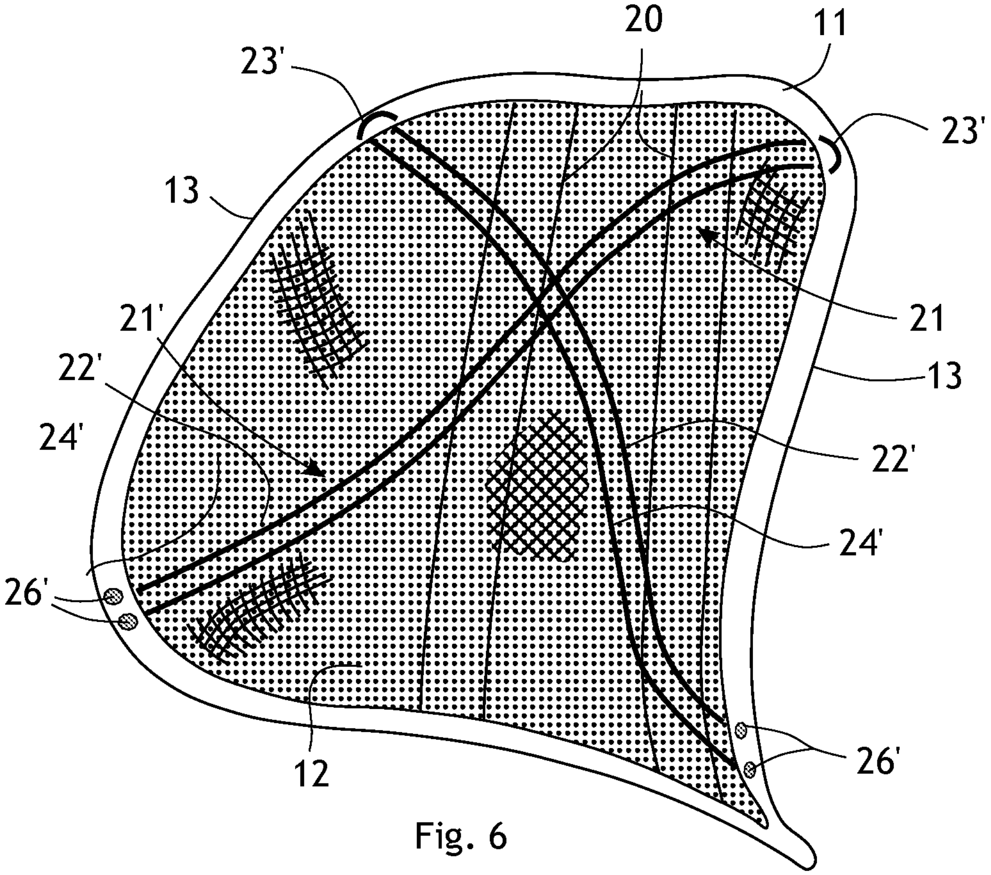
FIG. 6 is a perspective view of an alternative embodiment of the SMA massage apparatus of FIGS. 2-4.

With regard to FIG. 6, a further embodiment of the invention utilizes a lumbar back support frame 11 defining and circumscribing an opening that is spanned by a mesh or textile fabric 12, as described previously. A pair of shape memory wire segments 21', each housed in a flexible tubing (such as silicone or Teflon™ or the like). Each segment 21' includes one leg 22' extended laterally from one side of the frame of the support, across the web 12 of mesh material, looped at 23' at the opposed side, and redirected as a second leg 24' generally parallel to the leg 22' and extending back to the first side of the frame. The ends of the segment 21' are secured to electrical connectors 26', which in turn are joined electrically to a power circuit as described previously. In this embodiment the two segments 21' are arrayed obliquely in a crossing arrangement, each extending from the lower part of one side 13 to the loop 23' at the upper extend of the opposed side. The two segments 21' may be operated individually or in unison to apply a more forceful massage effect to the impinging body portion of the user.

Figure 7A:
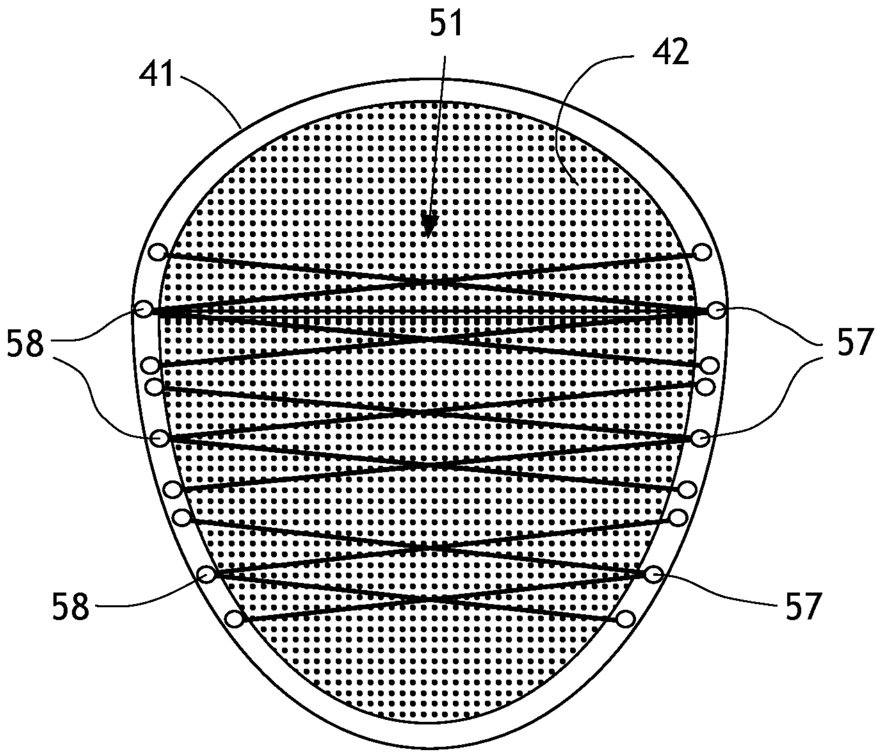
FIG. 7A is a plan layout of a further embodiment of the apparatus of the invention.
Figure 7B:
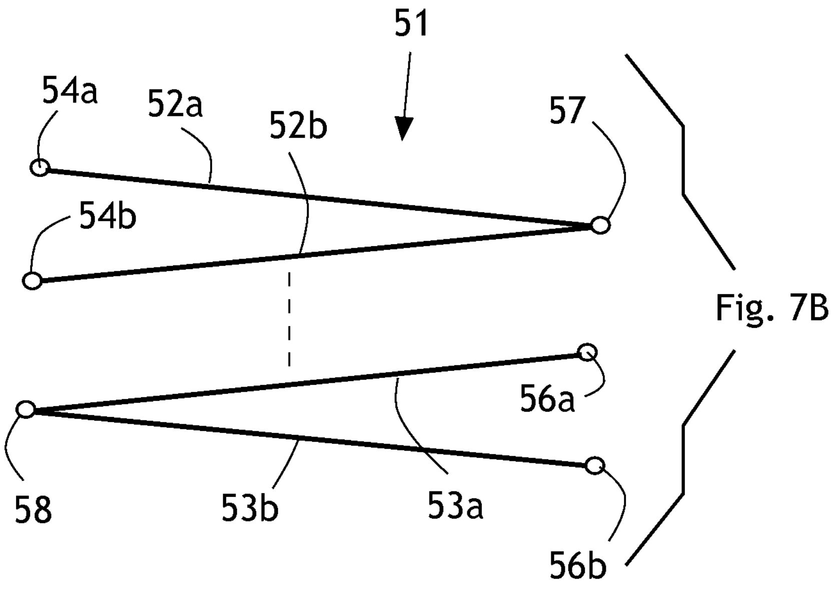
FIG. 7B is a detailed schematic view of the wiring layout of the apparatus of FIG. 7A.

With regard to FIGS. 7A and 7B, in a further embodiment a frame 41 is provided to define a circumscribed central opening that is spanned by a fabric component 42. The frame may comprise a back or seat portion of a piece of furniture, or may comprise a free-standing component that can be used in conjunction with any type of chair or seat. A salient feature is a plurality of overlapping horizontal ' V' segments 51 extending from both sides of the frame 41 and overlapping in a medial portion of the fabric component 42. A first plurality of segments 51 are each comprised of SMA legs 52*a* and 52*b* which extend from electrically active anchors 54*a* and 54*b* secured at one side of the frame 41, respectively, and converge at the opposite side at anchor 57 in a V configuration. A second plurality of segments 51 are each comprised of SMA legs 53*a* and 53*b* which extend from electrically active anchors 56*a* and 56*b* secured at the other side of the frame 41, respectively, and converge at the opposite side at anchor 58 in a V configuration.

When a voltage is applied between anchors 54*a*-54*b*, the SMA wire legs contract as described above with regard to previous embodiments; likewise, a voltage applied between anchors 56*a* and 56*b* will activate legs 53*a* and 53*b*. Due to the overlapping V arrangement, when a pair of overlapping V segments are energized simultaneously, large forces can be exerted on the frame, and consequently provide large normal forces to the mesh or fabric (to press into the back muscles of the user). Forces can be approximately doubled using this arrangement of SMA wires, providing a more forceful massage effect. The overlapping pairs of V segments 51 may be activated in a sequential manner, as described above, to provide a wave-like contraction moving through the massage device.

Figure 8:
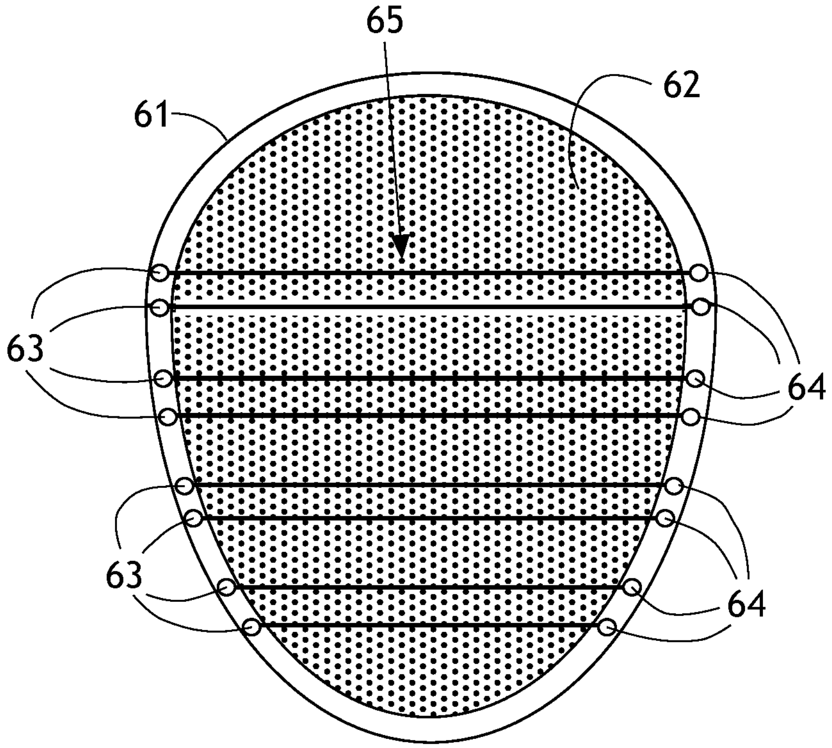
FIG. 8 is a plan layout of another embodiment of the SMA massage apparatus of the invention.

A further embodiment of the invention, shown in FIG. 8, also includes a closed frame 61 that defines a circumscribed central opening that is spanned by a fabric or mesh component 62. A plurality of single SMA wire segments 65 extend across the frame, each secured at opposed ends to respective electrically active anchors 63 and 64. In this wiring scheme, each SMA wire is of shorter length, spanning simply from left to right of the frame. Voltage can be applied entirely to the left side anchors 63, for example, while the right side anchors 64 are all electrically grounded. Both ends of the SMA wire need to be mechanically fastened to the frame, so the contraction of the SMA wire leads to compression into the body during energization (increasing the radius of curvature, essentially). One advantage to this configuration is that lower voltages can be used (as opposed to longer SMA wire lengths). In this manner, voltages compatible with direct 12-volt DC adapters can be employed without need for voltage boost convertors. Multiple wires can be powered simultaneously, so that the forces achieved by wire loops shown in previous embodiments can be achieved, and the only tradeoff in doing so is the increased current required. For SMA wires in contact with the human body, it is always desireable to use the shortest SMA wire lengths possible, so that the lowest voltages can be employed. Again, to energize long SMA wire lengths, higher voltages must be used if the desired actuation time is held constant.

Figure 9:
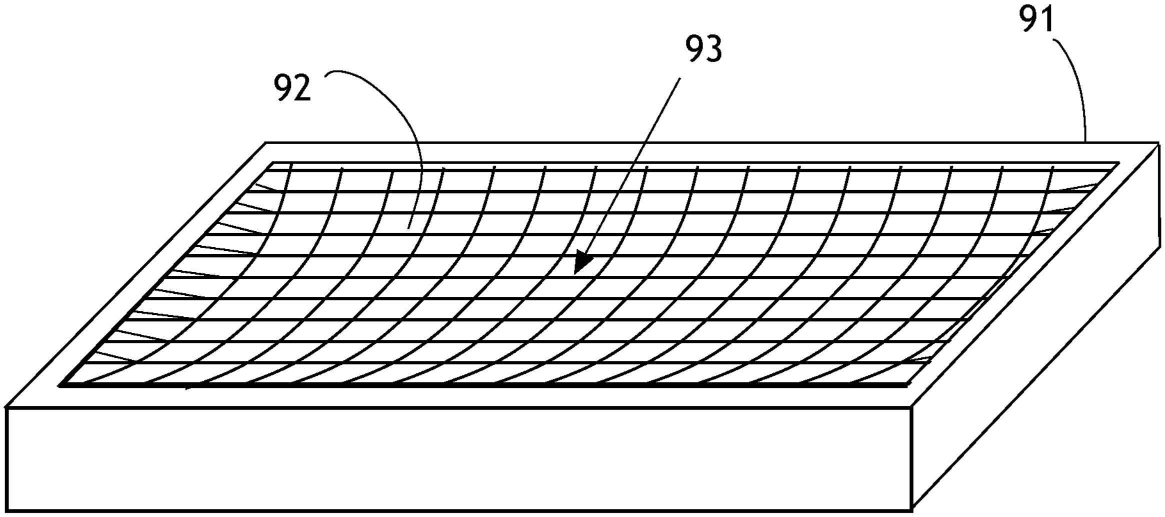
FIG. 9 is a perspective view of a further embodiment of the SMA massage apparatus of the invention.

The concept of SMA wires contracting and straightening and providing massaging motion to a mesh lumbar support frame can be further extended to a full body massaging 'bed'. With regard to the embodiment in FIG. 9, a bed frame 91 is provided to support the periphery of an inelastic (non-stretching) fabric or mesh material 92, such that the material forms a shallowly downwardly curved surface. A plurality of SMA wire segments 93 are suspended or attached to the material 92 suspended from a frame, and arrayed transversely to the length of the bed, so that they also take a curved shape in the rest configuration. When energized, the SMA wires contract, and straighten, providing force and displacement normal to the curve, thus pressing into or against the body. Any of the SMA wire layouts and connection arrangements described previously may be used in this embodiment. When multiple zones are arranged either in simple single-wire, U-wire, or Double-V wire approaches, the result is a full body massage.

Figure 10:
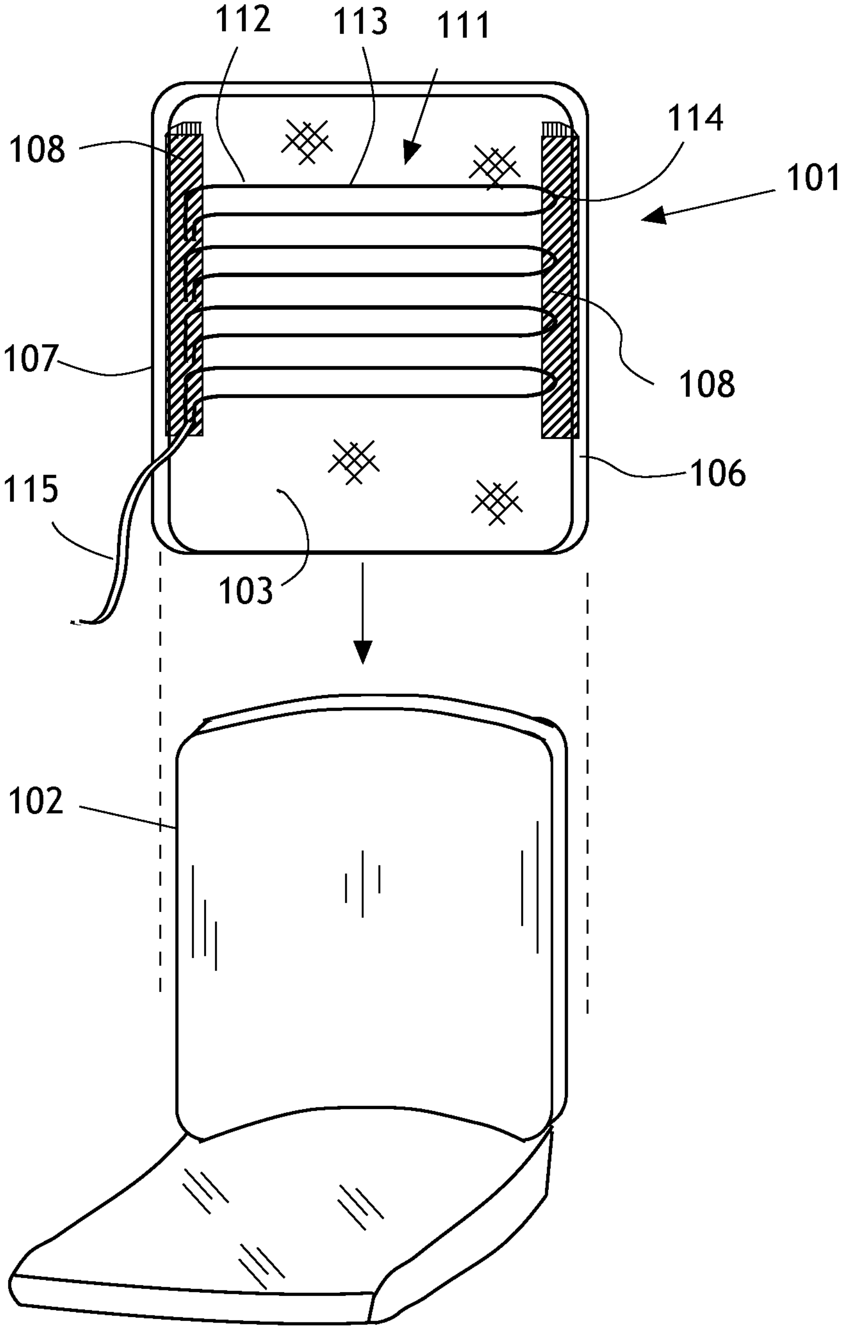
FIG. 10 is a perspective view of another embodiment of the SMA massage apparatus of the invention.

With regard to FIG. 10, a further embodiment of the SMA massage device comprises an apparatus 101 that may be removably secured to the back portion 102 of an existing chair. The apparatus 101 is configured in the manner of a slipcover that is adapted to be removably placed over the chair back 102. It includes front and back panels 103 formed of a fabric material that is slightly elastic, the panels having a perimeter shape similar to that of the chair back. The panels 103 are sewn or otherwise joined together at the opposed side edges 106 and top end 107, and the bottom of the assembly is an open end. Sewn into the opposed side edges are a pair of structural web components 108 extending therealong to add strength and stiffness to the side edges of the assembly.

A plurality of SMA wire segments 111 are secured within the slipcover 101, and may comprise any of the arrangements shown in FIGS. 2, 3, 6, 7A and 7B, and 8. In one exemplary arrangement the segments 111 each include parallel legs 112 and 113 extending integrally from a loop end 114 that is secured in one of the structural webs 108 at side 106. The other ends of the legs 112 and 113 are secured in the other, opposed structural web 108 at side 107, and are connected to a power cable 115. The power cable 115 may be connected as shown in FIG. 5 to the electronic system of the invention to activate the SMA segments 111 as described previously.

The slipcover assembly 111 is placed over the chair back 102 by placing it in the open bottom end of the assembly 111, as indicated by the arrow and the dotted lines. The slipcover assembly is dimensioned to be received about the chair back 102 in a tight fit, so that the panels 103 and the SMA wire legs 112 and 113 extend generally taut across the chair back. The structural web components engage the side edges of the chair back 102 so that the SMA wire segments 111 are essentially anchored and span the chair back. Thus as a chair user leans back against the panel 103 and the chair back, the SMA wire segments 111 impinge on the back of the user and are positioned to apply a massage force normal to the back of the user. In addition, some of the heat of SMA activation is conducted to the back of the user, and the fabric of the panel 103 may be selected to attenuate that heating effect to whatever degree is desireable.

The foregoing description of the preferred embodiments of the invention has been presented for purposes of illustration and description. It is not intended to be exhaustive or to limit the invention to the precise form disclosed, and many modifications and variations are possible in light of the above teaching without deviating from the spirit and the scope of the invention. The embodiments described are selected to best explain the principles of the invention and its practical application to thereby enable others skilled in the art to best utilize the invention in various embodiments and with various modifications as suited to the particular purpose contemplated. It is intended that the scope of the invention be defined by the claims appended hereto.

INDUSTRIAL APPLICABILITY

This invention may be embodied as a portable, lightweight, silent, electrically operated massage device for use with a wide range of existing chairs and other furniture. Alternatively, it may be embodied as a built-in device in chairs, beds, and similar furniture. It may also be used in conjunction with vehicle seating, such as automobiles, trucks, and aircraft, and in mobility appliances for disabled individuals who use wheelchairs and the like.

SEQUENCE LISTING

Not applicable.

The invention claimed is:

1. A massage apparatus for treating a human body, including:

a rigid peripheral frame defining a central opening, said frame including a first side spaced apart from a second side;

a fabric web spanning said central opening and adapted to be impinged upon by a portion of the body being treated and adopt a concave curvature in response to the impingement;

a plurality of shape memory wire segments extending between said opposed sides, said segments each having opposed ends mechanically fastened to each of said opposed sides of said frame, and at least one of said plurality of shape memory wire segments comprising a first leg extending from said first side to said second side of said frame, a second leg extending from said second side to said first side, and a looped portion passing through said second side of said frame;

said shape memory wire segments being disposed directly adjacent to said fabric web and disposed to adopt said concave curvature of said fabric web, said first leg and said second leg being spaced apart from each other across a gap along said fabric web, and said looped portion extending across said gap; and an electronic circuit connected to each of said shape memory wire segments and adapted to electrically activate said shape memory wire segments to contract and move normal to said concave curvature and impinge on the body portion being treated, said first leg, said second leg, and said looped portion of said at least one of said shape memory wire segments being electrically coupled.

2. The massage apparatus of claim 1, wherein said plurality of shape memory wire segments are disposed in parallel, spaced apart relationship, and said electronic circuit electrically activates said shape memory wire segments in serial, sequential fashion.

3. The massage apparatus of claim 1, further including a plurality of tubing members, each secured to one of said plurality of shape memory wire segments in concentric, coextensive relationship.

4. The massage apparatus of claim 1, wherein said peripheral frame comprises a closed curved loop, said loop having a concave curvature in a horizontal plane bisecting said loop and a convex curvature in a vertical plane bisecting said loop.

5. The massage apparatus of claim 4, further including a strap for securing said closed curved loop to the back of a chair.

6. The massage apparatus of claim 1, wherein said electronic circuit includes a power supply, and a plurality of power switching devices, each connected between said power supply and one of said plurality of shape memory wire segments.

7. The massage apparatus of claim 6, further including a microprocessor connected to said power switching devices and programmed to actuate said power switching devices in a predetermined manner.

8. The massage apparatus of claim 1, wherein said shape memory wire segments are more flexible than the frame.

9. The massage apparatus of claim 1, wherein each of said plurality of shape memory wire segments have a diameter which is no more than 0.015 inches.

10. The massage apparatus of claim 9, further comprising a return wire extending across said central opening from said first side to said second side of said frame, wherein said return wire is coupled to said fabric web and said return wire has a diameter which is at least 8 times greater than each of said plurality of shape memory wire segments.

11. The massage apparatus of claim 1, wherein each of said plurality of shape memory wire segments are electrically coupled to said electronic circuit at said first side of said frame, and each of said plurality of memory wire segments are electrically grounded at said second side of said frame.

12. A massage apparatus comprising:

a rigid frame extending from a first side to a second side, wherein an opening is defined between the first side and the second side;

a flexible fabric web extending across the opening, wherein the frame is curved to define a concave curvature in the fabric web adapted to receive and wrap laterally around a human back;

a plurality of shape memory segments extending across the opening from the first side to the second side of the frame, wherein each of the plurality of shape memory segments are disposed directly adjacent the fabric web, each of the plurality of shape memory segments are mechanically fastened to the first side of the frame and the second side of the frame, each of the plurality of the shape memory segments are movable from a first position to a second position responsive to an electrical current, while in the first position, each of the plurality of shape memory segments have a first curvature following the curvature of the fabric web, while in the second position, each of the plurality of shape memory segments have a second curvature which is less concave than the first curvature, at least one of the plurality of shape memory segments comprises a first leg extending from the first side to the second side of the frame, a extend leg extending from the second side to the first side, and a looped portion passing through the second side of the frame, each of the first leg and the second leg are disposed directly adjacent the fabric web, and the first leg and the second leg are spaced apart from each other across a gap along the fabric web, and the looped portion extends across the gap; and an electrical system comprising a power source and a plurality of switches, wherein the electrical system is adapted to provide an electrical current to and selectively move each of the plurality of shape memory segments, and the first leg, the second leg, and the looped portion of the at least one of the shape memory segments are electrically coupled.

13. The massage apparatus of claim 12, wherein each of the plurality of shape memory segments have a diameter which is no more than 0.015 inches.

14. The massage apparatus of claim 13, further comprising a return wire extending across the opening from the first side to the second side of the frame, wherein the return wire is coupled to the fabric web.

15. The massage apparatus of claim 14, wherein the return wire has a diameter which is at least 8 times greater than each of the plurality of shape memory segments.

16. The massage apparatus of claim 12, wherein each of the plurality of shape memory segments are electrically coupled to the electrical system at the first side of the frame, and each of the plurality of memory segments are electrically grounded at the first side of the frame.

17. The massage apparatus of claim 12, wherein each of the plurality of shape memory segments is at least 33 inches in length and no greater than 66 inches in length.

18. A massage apparatus comprising:

a rigid frame extending from a first side to a second side, wherein an opening is defined between the first side and the second side;

a flexible fabric web extending across the opening, wherein the frame is curved to define a concave curvature in the fabric web adapted to receive and wrap laterally around a human back;

a plurality of shape memory segments extending across the opening from the first side to the second side of the frame, wherein each of the plurality of shape memory segments are disposed directly adjacent the fabric web, each of the plurality of shape memory segments are mechanically fastened to the first side of the frame and the second side of the frame, each of the plurality of the shape memory segments are movable from a first position to a second position responsive to an electrical current, while in the first position, each of the plurality of shape memory segments have a first curvature following the curvature of the fabric web, while in the second position, each of the plurality of shape memory segments have a second curvature which is less concave than the first curvature, and each of the plurality of shape memory segments have a diameter which is no more than 0.015 inches;

a return wire extending across the opening from the first side to the second side of the frame, wherein the return wire is coupled to the fabric web wherein the return wire has a diameter which is at least 8 times greater than each of the plurality of shape memory segments; and an electrical system comprising a power source and a plurality of switches, wherein the electrical system is adapted to provide an electrical current to and selectively move each of the plurality of shape memory segments.

19. The massage apparatus of claim 18, wherein:

a first portion of the plurality of shape memory segments comprises a first leg extending from the first side to the second side of the frame, a second leg extending from the second side to the first side, and a looped portion passing through the second side of the frame, the first leg and the second leg being angularly offset at the second side to form a V-configuration;

a second portion of the plurality of shape memory segments comprises a first leg extending from the second side to the first side of the frame, a second leg extending from the first side to the second side, and a looped portion passing through the first side of the frame, the first leg and the second leg being angularly offset at the first side to form a V-configuration; and the first portion of the plurality of shape memory segments overlap across the fabric web with the second portion of the plurality of shape memory segments.

20. The massage apparatus of claim 19, wherein:

the first portion of the plurality of shape memory segments are electrically coupled to the electrical system at the first side of the frame, and each of the plurality of memory segments are electrically grounded at the second side of the frame; and the second portion of the plurality of shape memory segments are electrically coupled to the electrical system at the second side of the frame, and each of the plurality of memory segments are electrically grounded at the first side of the frame.

* * * * *